Figure 1:
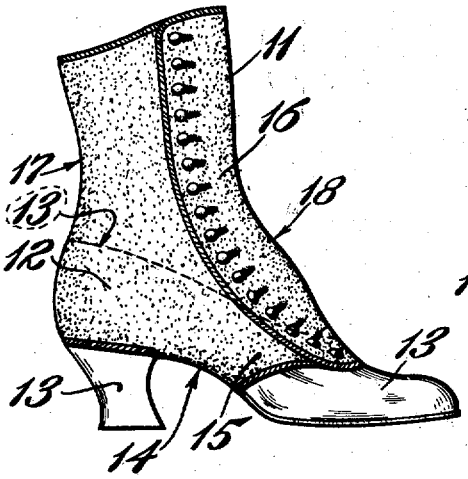

C. TWEEDIE.

BOOT TOP.

APPLICATION FILED MAY 20, 1922.

Reissued July 18, 1922. 15,416.

Inventor:
Charles Tweedie,
by Connett Cann,
his Attorneys.

UNITED STATES PATENT OFFICE.

CHARLES TWEEDIE, OF JEFFERSON CITY, MISSOURI.

BOOT TOP.

15,416. Specification of Reissued Letters Patent. Reissued July 18, 1922.

Original No. 1,153,977, dated September 21, 1915, Serial No. 876,404, filed December 10, 1914. Application for reissue filed May 20, 1922. Serial No. 562,538.

*To all whom it may concern:*

Be it known that I, CHARLES TWEEDIE, a citizen of the United States, and a resident of Jefferson City, in the county of Cole and State of Missouri, have invented a new and useful Improvement in Boot Tops, of which the following is a specification.

This invention relates to boot-tops which are made and sold separately from the boot, and which are intended to be worn over low shoes in the manner of over-gaiters.

The object of the invention is a full quarter boot-top of cloth or other distinctive material, and which is adapted to be worn over a low shoe to simulate the appearance of a cloth top boot, thereby disguising its true character.

The invention consists in a boot-top having the quarters cut full length to the line of the sole at the heel and instep, with a strap conforming to the shape and width of the sole across the instep, and with the forepart cut approximately on the line of a circular vamp.

The invention further consists in the arrangement of the back seam near the heel and the front seam from over the instep to the forward end, which are cut a trifle scant in order to put "spring" into the top at these places and cause it to hug the shoe.

Further details of the invention appear in connection with the following description of the boot-top shown in the accompanying drawing, wherein the same reference characters designate like parts in the several views.

Figure 2:
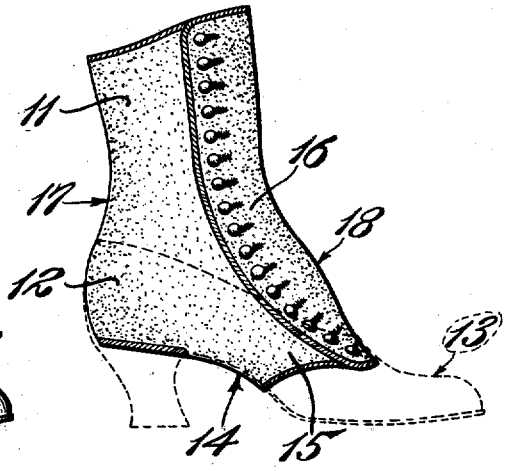
Figure 4:
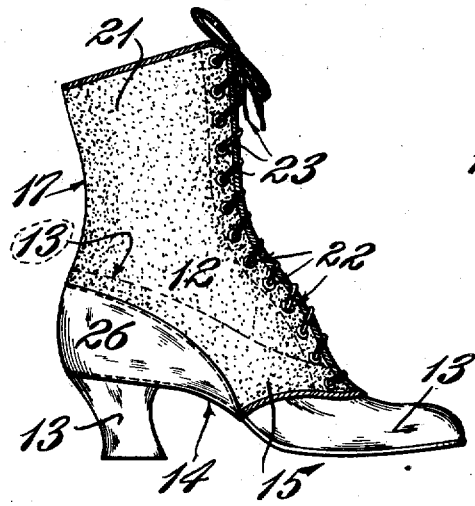
Figure 3:
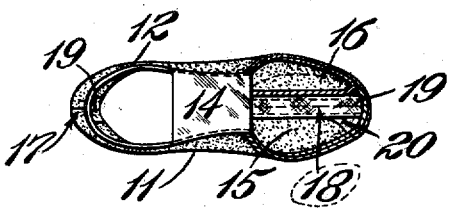
Figure 5:
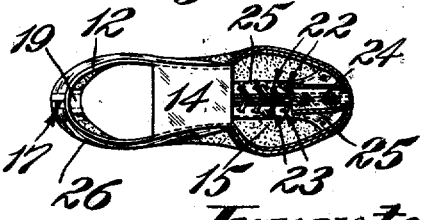

In the drawings, Figure 1 is a side elevation of the low shoe fitted with a boot-top embodying the invention; Figure 2 is a side view of the top alone, showing in dotted lines the outline of the shoe shown in Figure 1, and illustrating the departure of the top from the lines of the shoe at the heel and over the instep; Figure 3 is a bottom view of the top shown in Figure 2; Figure 4 is a view similar to Figure 1 showing a different style of boot-top and Figure 5 is a bottom view of the top shown in Figure 4.

In the embodiment of the invention illustrated in Figures 1, 2 and 3, the button boot-top 11 comprises quarters 12 of suitable material, such as leather, broadcloth, or other fabric, cut full length, that is, from the upper extremity of the leg portion to the top line of the sole and heel of the shoe 13.

A strap 14 of patent leather or other suitable material connects the lower edges of the quarters in front of the heel. The lower portion 15 of the quarters extends forward of the instep, their front edges following line of the top of the vamp across the front of the shoe and sloping downward and backward at the sides to about the forward line of the shank portion of the sole of the shoe. The boot-tops are made rights and lefts, and the two quarters of each top are cut slightly different along their front and bottom edges. The quarter which comes on the inner side of the foot has a flap 16 which laps over the outside quarter and is buttoned thereto. The quarter on the inner side is cut slightly longer from top to bottom at the forward end of the sole than the quarter on the outer side, the difference in length between the two gradually diminishing toward the heel, at which point the length of the two sides is alike, whereby the strap 14 may conform to the shape of the sole of the shoe. The seamed portion at the back seam 17 is sprung in slightly at the heel, the amount of springing being greatest at the bottom of the seam and running out to nothing at the fullest part of the swell above the heel. The seamed portion at the front seam 18, in button boot-tops, is sprung down toward the forward end of the top, the amount of springing being greatest at the front end and running out to nothing over the instep.

In the manufacture of shoes, the upper is made of parts that are cut conformably to patterns and are then united together by seams at the front and back. The upper is then pulled tightly over or around a last and secured to the sole while still stretched around the last. For many years past, shoes have been graded in standard sizes, and certain measurements of the last have been established as standard throughout the United States, and the patterns conformably to which the parts of the upper are cut are made with reference to such standard last measurements. For the sake of neatness of appearance, the parts of the upper are cut so that the front and rear seams will lie in vertical planes. As the last is rigid and the upper is pulled tight over the last at the time of soling, the upper fits the last tight; but while the shoe made on a last fits that last tight, comfort requires that a shoe must be larger than the foot on which it is worn and I take advantage of these facts in my present invention.

According to my invention, the parts of the upper are made with reference to the recognized practice of shoe pattern making with certain exceptions that bring about a slight springing in of the portion at the back seam below the swell of the heel, and a slight springing in of the portion at the front seam below the instep. What I mean by "springing in" at said seamed portions may be understood by assuming that my boot-top fits a shoe at and above the instep and at and above the swell of the heel. In such case, all of the buttons of my boot-top at and above the instep can be readily buttoned while such shoe is on the last on which it was made; but in such case, the buttons below the instep will fail to reach their buttonholes by an amount that gradually increases from the instep to the front lower edge of the boot-top. When, however, this last is removed from such shoe and the shoe is placed on a human foot which it fits comfortably and my boot-top applied thereto, all of its buttons can be buttoned; for, in such case, the shoe and the foot can yield sufficiently to permit such buttoning even though the boot-top is of less girth below the instep than the corresponding portion of the shoe in its normal condition.

The boot-top is lined with cotton, duck or other suitable material, and the front and back seams are covered with strips 19 of suitable material, whereby the seamed portions are stiff enough to prevent the top from wrinkling. The front part of the boot-top is also stiffened by an extra piece 20 of buckram or other suitable stiffening material.

The boot-top 21 shown in Fig. 4 is similar to the boot-top 11, except that it has no front flap, but is provided with eyelets 22 down the front edges of the quarters for lacings 23. A tongue 24 is also provided, which is secured at its lower front end to either quarter alone, preferably the outside quarter, or to both quarters. The front edges of the quarters are reinforced by strips 25 of buckram or other suitable stiffening material. A foxing 26 of patent leather or other distinctive material is sewed around the heel portion of the quarters to give the appearance of a fancy dress shoe.

It is evident that the style of the boot-top may be varied, and its appearance may be changed without departing from the invention. For example, the seams may be covered with leather, and a leather foxing may be put around the heel in imitation of a full length vamp. The invention is not restricted to the precise forms shown and described herein.

What I claim is:

1. A boot-top to be worn over a low shoe, said boot-top having full length quarters following the general lines of the upper portion of a high boot, the lower edges of said boot-top being arranged to coincide with the edges of the sole of the shoe around the heel and along the sides of the shank, and the front and back lower portions of said boot-top being sprung in a sufficient amount to make the lower edges of such portions closely hug the shoe, and a strap connecting the lower side edges of the boot-top, said strap being arranged to lie beneath and fit the shank of the shoe from the breast of the heel to the points where the lower edges of the boot-top intersect the edges of the sole.

2. A boot-top to be worn over a shoe, said boot-top having full length quarters following the general lines of the upper portion of a high boot, the lower edges of said boot-top being arranged to coincide with the edges of the sole of the shoe along the sides of the shank, and the back lower portion of said boot-top being sprung in a sufficient amount to make the lower edges of the heel portion closely hug the shoe, and a connecting strap sewed to the lower side edges of the boot-top where they coincide with the edges of the sole, said strap being arranged to fit snugly beneath the shank of the shoe and draw in said lower side edges.

3. A boot-top to be worn over a shoe, said boot-top having full length quarters following the general lines of the upper portion of a high boot, the lower edges of said boot-top being curved to coincide with the arched edges of the sole of the shoe along the sides of the shank, and the lower portion of the front of said boot-top being sprung in a sufficient amount to make the lower edges of the front portion of the boot-top closely hug the shoe, and a strap connecting the lower side edges of the boot-top, said strap having curved ends to conform to the concave shank of the shoe and which ends are sewed to the lower curved edges of the boot-top where they coincide with the concave edges of the sole.

4. A boot-top to be worn over a shoe, said boot-top having quarters following the general lines of the upper portion of a high boot, the lower edges of said boot-top coinciding with the edges of the sole of the shoe along the sides of the shank, said boot-top having a side opening and a front seam, a strip of material along said front seam for stiffening it lengthwise, the lower portion of said front seamed portion being sprung in a sufficient amount to make the lower edges of the boot-top closely hug the shoe in front, and a strap connecting the lower side edges of the boot-top, said strap having ends shaped to conform to the shape of the shank of the shoe and which ends are sewed to the lower edges of the boot-top where they coincide with the edges of the sole.

5. A boot-top to be worn over a low shoe, said boot-top having full length quarters following the general lines of the upper portions of a high boot, the lower edges of said boot-top being arranged to coincide with the edges of the sole of the shoe around the heel and along the sides of the shank, and a strap connecting the lower side edges of the boot-top and constituting an anchoring member therefor, the girth measurement of said boot-top at the instep and through said strap being greater than the girth measurement of the shoe and foot at the instep and around the shank of the shoe, and the girth measurement of the boot-top at its forward tip and through said strap being less than the corresponding girth measurement of the shoe, whereby said boot-top fits the shoe comfortably at the instep girth and the fit forward of the instep becomes gradually tighter to the tip of such boot-top.

6. A boot-top to be worn over a low shoe, said boot-top having full length quarters following the general lines of the upper portions of a high boot and having a strap portion for anchoring said boot-top under the shanks of the shoe, the lower edges of said boot-top being arranged to coincide with the edges of the sole of the shoe around the heel and along the sides of the shank, the girth measurement of said boot-top through the strap and around the instep being in excess of the girth of the shoe and foot measured at the instep and under the shank of the shoe, and such boot-top girth measurements forward of the instep gradually decreasing more and more to the tip of said boot-top relative to the corresponding shoe and foot measurements, whereby said boot-top is adapted to make a comfortable fit at the instep while the front tip of the boot-top hugs the shoe.

7. A boot-top to be worn over a low shoe, said boot-top having full length quarters following the general lines of the upper portion of a high boot, the lower edges of said boot-top being arranged to coincide with the edges of the sole of the shoe around the heel and along the sides of the shank, and a strap connecting the lower side edges of the boot-top and constituting an anchoring member therefor, the lower portions of the front and back of said boot-top being sprung in slightly at the seams so that the lower front edge of said boot-top will hug the shoe tightly while the fit at and above the instep is free.

8. A boot-top to be worn over a low shoe, said boot-top having full length quarters following the general lines of the upper portions of a high boot and having a row of cooperating buttons and button holes, the lower edges of the said boot-top being arranged to coincide with the edges of the sole of the shoe around the heel and along the sides of the shank, and a strap connecting the lower side edges of the boot-top and constituting an anchoring member therefor, the portion of the rear seamed portion below the swell at the heel springing in slightly, and the girth measurements below the instep being adapted to make the lower front edge of the boot-top hug the shoe tightly while the fit at the instep is free.

Signed at Jefferson City, Missouri, this 8th day of May, 1922.

CHARLES TWEEDIE.